US011295451B2

United States Patent
Wiemker et al.

(10) Patent No.: US 11,295,451 B2
(45) Date of Patent: Apr. 5, 2022

(54) ROBUST PULMONARY LOBE SEGMENTATION

(71) Applicant: KONINKLIJKE PHILIPS N.V., Eindhoven (NL)

(72) Inventors: Rafael Wiemker, Kisdorf (DE); Tobias Klinder, Uelzen (DE); Alexander Schmidt-Richberg, Hamburg (DE); Axel Saalbach, Hamburg (DE); Irina Waechter-Stehle, Hamburg (DE); Tim Philipp Harder, Ahrensburg (DE); Jens von Berg, Hambrug (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 552 days.

(21) Appl. No.: 16/319,701

(22) PCT Filed: Jul. 26, 2017

(86) PCT No.: PCT/EP2017/068826
§ 371 (c)(1),
(2) Date: Jan. 22, 2019

(87) PCT Pub. No.: WO2018/024555
PCT Pub. Date: Feb. 8, 2018

(65) Prior Publication Data
US 2021/0295524 A1 Sep. 23, 2021

(30) Foreign Application Priority Data
Aug. 2, 2016 (EP) .................................. 16182422

(51) Int. Cl.
*G06K 9/00* (2006.01)
*G06T 7/12* (2017.01)
*G06T 7/149* (2017.01)

(52) U.S. Cl.
CPC ................ *G06T 7/12* (2017.01); *G06T 7/149* (2017.01); *G06T 2207/10072* (2013.01); *G06T 2207/30061* (2013.01)

(58) Field of Classification Search
CPC . G06T 7/12; G06T 7/149; G06T 2207/10072; G06T 2207/30061; G06T 2207/30064
See application file for complete search history.

(56) References Cited

U.S. PATENT DOCUMENTS 7,512,276 B2    3/2009  Fung
2010/0027861 A1  2/2010  Shekhar et al.
(Continued)

FOREIGN PATENT DOCUMENTS

JP    2008142481 A    6/2008
JP    2009100230      5/2009
(Continued)

OTHER PUBLICATIONS

Doel, et al., "Review of automatic pulmonary lobe segmentation methods from CT", Computerized Medical Imaging and Graphics, vol. 40, Mar. 2015, pp. 13-29.
(Continued)

*Primary Examiner* — Atiba O Fitzpatrick

(57) ABSTRACT

An image processing system and related method. The system comprises an input interface (IN) configured for receiving an n[≥2]-dimensional input image with a set of anchor points defined in same, said set of anchor points forming an input constellation. A constellation modifier (CM) is configured to modify said input constellation into a modified constellation. A constellation evaluator (CE) configured to evaluate said input constellation based on said hyper-surface to produce a score. A comparator (COMP) is configured to compare said score against a quality criterion. Through an output interface (OUT) said constellation is output if the
(Continued)

score meets said criterion. The constellation suitable to define a segmentation for said input image.

20 Claims, 4 Drawing Sheets

(56) References Cited

U.S. PATENT DOCUMENTS

| | | | |
|---|---|---|---|
| 2010/0189320 A1* | 7/2010 | Dewaele | G06T 7/162 382/128 |
| 2011/0026785 A1* | 2/2011 | Dewaele | G06K 9/6209 382/128 |
| 2011/0045428 A1* | 2/2011 | Boltunov | G06T 19/20 433/24 |
| 2015/0254843 A1 | 9/2015 | Brown et al. | |
| 2018/0137626 A1* | 5/2018 | Lawrenson | G06T 7/0012 |

FOREIGN PATENT DOCUMENTS

| | | |
|---|---|---|
| JP | 2016059457 | 4/2016 |
| WO | 0110339 A2 | 2/2001 |
| WO | 2013007063 A1 | 1/2013 |

OTHER PUBLICATIONS

Schmidt-Richberg, et al., "Evaluation of Algorithms for Lung Fissure Segmentation in CT Images", Bildverarbeitung für die Medizin, Springer 2012 (Abstract).
Qi, et al., "Automated pulmonary fissure detection and lobe segmentation in CT chest images", BioMedical Engineering OnLine 2014 13:59, pp. 1-19.
ACR American College of Radiology, "Lung CT Screening Reporting & Data System" (Abstract).
Sun, S., "Automated and interactive approaches for optimal surface finding based segmentation of medical image data", University of Iowa, Theses and Dissertations, Dec. 2012.
Sun, et al., "Lung Segmentation Refinement based on Optimal Surface Finding Utilizing a Hybrid Desktop/Virtual Reality User Interface", Comput Med. Imaging Graph, Jan. 2013, 37(1); pp. 1-34.
Birkbeck, et al., "Robust Segmentation of Challenging Lungs in CT using Multi-Stage Learning and Level Set Optimization", pp. 1-24 (Abstract).
Zhang, et al., "Atlas-Driven Ling Lobe Segmentation in Volumetric X-Ray CT Images", IEEE Transactions on Medical Imaging, vol. 25, No. 1, Jan. 2006, pp. 1-16.
Kitasaka, et al "A method for dividing the lung into bronchopulmonary segments based on bronchial tree", IEICE Tech. Rep., vol. 107, No. 220, MI2007-40, pp. 29-32, Sep. 2007. Abstract.

* cited by examiner

ROBUST PULMONARY LOBE SEGMENTATION

This application is the U.S. National Phase application under 35 U.S.C. § 371 of International Application No. PCT/EP2017/068826, filed on Jul. 26, 2017, which claims the benefit of European Application Serial No. 16182422.2, filed Aug. 2, 2016. These applications are hereby incorporated by reference herein.

FIELD OF THE INVENTION

The invention relates to an image processing system, to an image processing method, to a computer readable medium, to a computer program element.

BACKGROUND OF THE INVENTION

Lung cancer screening with CT is recognized as mortality reducing and cost efficient. Even in high risk groups, however, only 1 in 20 lung nodules is actually cancerous. One of the widely acknowledged risk factors for lung nodule malignancy is the location, that is, in which of the five lung lobes a detected nodule resides in. A good segmentation of the five pulmonary lobes is therefore desirable.

A wide range of publications describe ways for semi- or fully automated image processing methods to segment for the lung lobes. See for instance Shouliang Qi et al in "Automatic pulmonary fissure detection and lobe segmentation in CT chest images", BioMedical Engineering OnLine, 13:59, 2014.

Existing approaches have been developed and tested on so-called diagnostic CT scans acquired with standard dose and thin-slice reconstruction.

However, CT (computed tomography) based lung screening is performed using low-dose or ultra-low dose scans with high image noise, and these are then reviewed using low resolution thick-slice reconstruction in which the thin pulmonary fissures may not be present with sufficient definition.

SUMMARY OF THE INVENTION

There may therefore be a need for alternative method and system to segment images.

The object of the present invention is solved by the subject matter of the independent claims where further embodiments are incorporated in the dependent claims. It should be noted that the following described aspect of the invention equally applies to the image processing method, to the computer program element and to the computer readable medium.

According to a first aspect of the invention there is provided an image processing system, comprising:
  an input interface configured for receiving an $n[\geq 2]$-dimensional input image with a set of anchor points defined in same, said set of anchor points forming an input constellation;
  a constellation modifier configured to modify said input constellation into a modified constellation;
  a constellation evaluator configured to evaluate said input constellation to produce a score;
  a comparator configured to compare said score against a quality criterion; and an output interface for outputting said constellation if the score meets said criterion, said constellation being suitable to define a segmentation for said input image.

According to another aspect, there is provided an image processing system, comprising:
  an input interface configured for receiving an $n[\geq 2]$-dimensional input image with a set of anchor points defined in said input image, said set of anchor points forming an input constellation;
  a constellation modifier configured to modify said input constellation into a modified constellation by varying at least one coordinate of at least one of the anchor points and projecting at least one of the coordinates of the at least one anchor point of the input constellation onto a hyperplane through the anchor points, where the hyperplane is previously fitted to the anchor points in said input constellation, and where the varying is confined to within said hyperplane;
  a constellation evaluator configured to evaluate said modified constellation to produce a score;
  a comparator configured to compare said score against a quality criterion, said criterion evaluating a suitability of the modified constellation to define a segmentation for said input image; and
  an output interface for outputting said modified constellation if the score meets said criterion.

According to one embodiment, the constellation modifier is configured to vary at least one coordinate of at least one of the anchor points to obtain the modified constellation.

According to one embodiment, the constellation modifier is configured to
  apply a random operation to vary the at least one coordinate.

According to one embodiment, the constellation modifier operates to project at least one of initial coordinates of the at least one anchor point onto a hyperplane through the anchor points and where the varying is confined to within said hyperplane.

According to one embodiment, the image processing system comprises a surface fitter configured to fit an $[n-1]$-dimensional hypersurface to said modified input constellation, and wherein the constellation evaluator produces said score based on said hypersurface. IN this embodiment, the constellation defines said hypersurface and this may be output as the segmentation.

According to one embodiment, the image processing system comprises a classifier component configured to classify whether a segmented image portion in the input image lies to either side of the hypersurface or whether said segmented portion extends through the hypersurface.

According to one embodiment, the image processing system comprises a visualizer configured to visualize the input image with said hypersurface or said constellation on a display device.

According to one embodiment, the image processing system is configured to iterate through a plurality of constellations including said input constellation so as to improve, or to at least maintain, said score.

According to one embodiment, the number of anchor points remains fixed. According to one embodiment, the input image is a 3D image volume, in particular of a human or animal lung. The term hypersurface is used in the general sense herein. That is, if the input image is 3D, the hypersurface is a 2D surface in the usual sense in 3D. If the input image is 2D, the hyper-surface is a 1D curve in 2D.

According to another aspect there is provided a method of image processing, comprising the steps of:
  receiving an $n[\geq 2]$-dimensional input image with a set of anchor points defined in same, said set of anchor points forming an input constellation;

modifying said input constellation into a modified constellation;
evaluating said input constellation to produce a score;
comparing said score against a quality criterion; and
outputting said constellation if the score meets said criterion, said constellation defining a segmentation for said input image.

According to another aspect, there is provided a method of image processing, comprising the steps of:
receiving an n[≥2]-dimensional input image with a set of anchor points defined in said input image, said set of anchor points forming an input constellation;
modifying said input constellation into a modified constellation by varying at least one coordinate of at least one of the anchor points and projecting at least one of the coordinates of the at least one anchor point of the input constellation onto a hyperplane through the anchor points, where the varying is confined to within said hyperplane by varying at least one coordinate of at least one of the anchor points and projecting at least one of the coordinates of the at least one anchor point of the input constellation onto a hyperplane through the anchor points, where the hyperplane is previously fitted to the anchor points in said input constellation, and where the varying is confined to within said hyperplane;
evaluating said modified constellation to produce a score;
said score against a quality criterion, said criterion evaluating a suitability of the modified constellation to define a segmentation for said input image; and
outputting said modified constellation if the score meets said criterion.

According to one embodiment, the method comprising: fitting an [n−1]-dimensional hyper-surface to said modified input constellation, wherein the score in said evaluating step is based on said hypersurface. In this embodiment, it is the hypersurface that is output as the segmentation.

According to another aspect there is provided a computer program element, which, when being executed by one or more processing units is adapted to perform the method steps.

According to another aspect there is provided a computer readable medium having stored thereon the program element.

The proposed system affords an accurate and computationally efficient segmentation in particular for low resolution and high noise imagery, such as in lobe segmentation based on CT screening images. The system can be used in lung image segmentation tasks where one wished to segment lobe structures. The proposed approach is robust and fast enough to be applicable for low dose CT screening applications.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
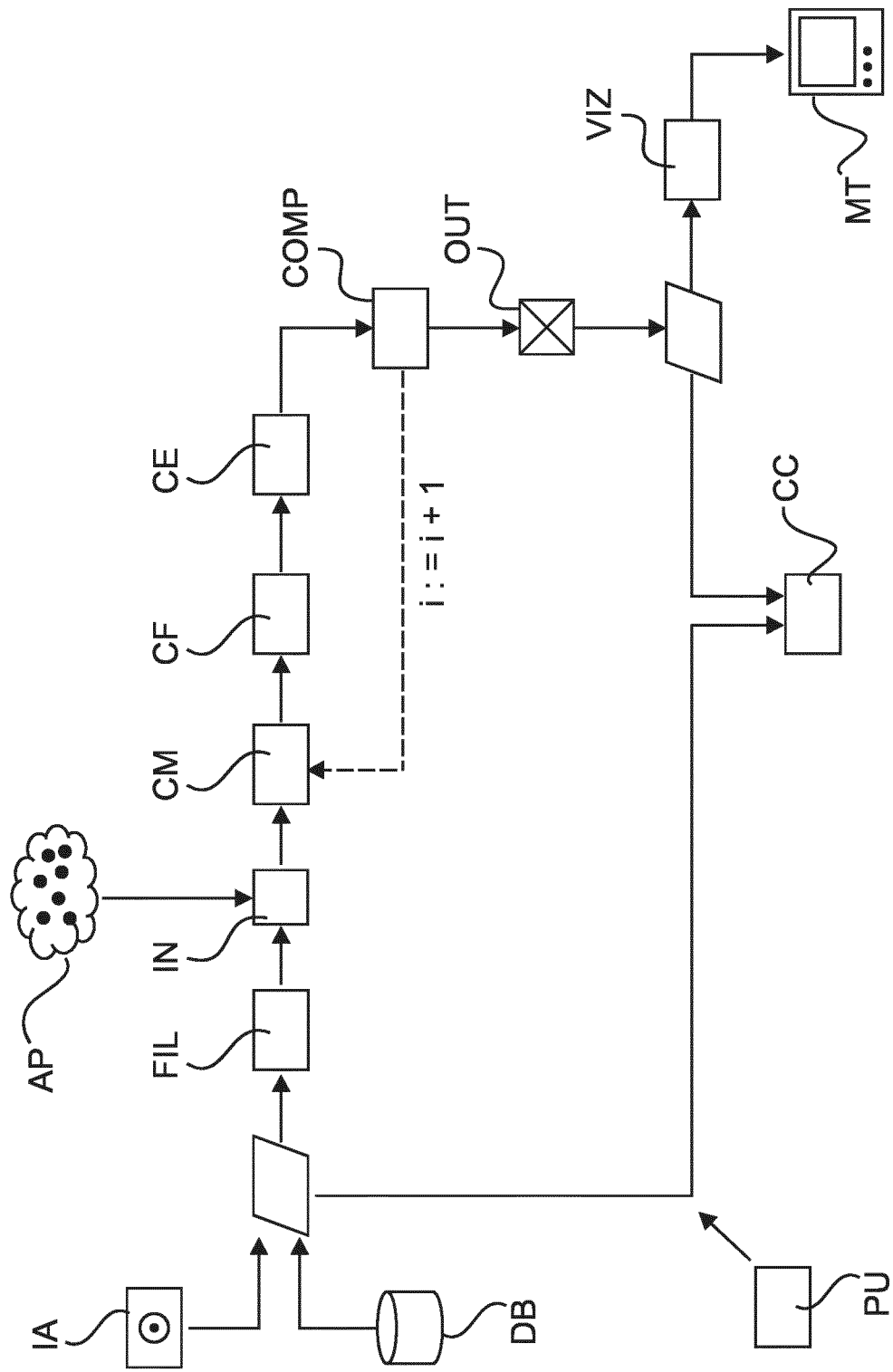
FIG. 1 shows a block diagram of an image processing system.

Reference is made to FIG. 1 which is a schematic block diagram of an image processing system as envisaged herein according to one embodiment. The image processing system can be integrated into a PACS or HIS or other image administration computer system. The image processing system may be arranged on one or servers PU in a distributed architecture. Alternatively, the image processing system may be arranged on other computing equipment PU, such as work station associated with an imaging apparatus (such as a CT) or may be arranged on a mobile unit (laptops, tablets, smartphones, etc.). The image processing system IPS allows processing of imagery. The imagery is either directly supplied by an imaging apparatus IA or is retrieved from a data base DB or other memory. Alternatively, some or all components of the IPS may be arranged in hardware such as a suitably programmed FPGA (field-programmable-gate-array) or as hardwired IC chip.

One of the applications envisaged herein is processing of computed tomography (CT) imagery produced in the context of lung cancer screening. Although in the following main reference will be made to this lung screening context, this is not limiting and other applications in the medical (or non-medical field) are also envisaged herein.

In lung screening CT one or more volumetric images of the object of interest (in this case human or animal lungs) is acquired. This imagery will be referred to herein as the object images.

The object imagery is preferably 3D (or even 4D, that is, a time series of image volumes) but this is not necessarily limiting as processing of 2D imagery in other applications is also envisaged herein. The object image includes image values at voxel positions x,y or x,y,z for the 3D applications which will be considered herein in more detail. The image values encode a particular quantity of interest. In CT, image values usually represent the amount of attenuation experienced by the interrogating x-ray beam that has traversed in the image acquisition the subject and was then acquired at projection imagery at a detector and processed (by using reconstruction algorithms, eg filtered-back-projection or others) into the object imagery. The different amounts of attenuation allow differentiating into different tissue densities. The imager values are usually encoded in Hounsfield units and these units represent the different tissue densities. The image values encode image structures that represent respective anatomical details of the patient. In particular, in the lung screening context, the image values of the object image encode human or animal lung tissue of the left and/or the right lung.

Each lung comprises parts, called "lobes". Specifically, there are two lobes in the left lung and three lobes in the right lung. The lobes form distinct lung portions that interface each other at so called fissures. The interfacing of the lobes is represented in lung imagery as fissure lines. There is a fissure line between upper and lower lobe in the left lung and there are two fissures that separate the right lung into three lobes, the upper, middle and lower lobe. The fissure in the left lung and the fissure between the lower and middle lobe in the right lung are called oblique fissures ("fissure lines") whereas the fissure between the upper and middle lobe in the right lung is called the horizontal fissure.

What one wishes to do in CT screening is to assess the malignancy of so called lung nodules that may form in the human lung. Lung nodules are distinct singularities of tissue growths or similar lesions surrounded by homogenous lung tissue. The malignancy of a given module has been observed to be a function of its relative location to a fissure line. For instance, a nodule that has been found to extend through a fissure line (that is, it is located partly in two different lobes) has a greater chance to represent cancer as a nodule that is not traversing a fissure line. It has been further found that the distance from the fissure line is also a statistical indicator for malignancy where nodules further away from the fissure lines are deemed more dangerous than those very close to the fissure line but not extending there through. Another malignancy indicator is in which of the lobes the nodule is located. For instance, a nodule located in an upper lobe has a higher malignancy likelihood than a nodule located in a lower lobe.

In lung CT it is hence beneficial to know the precise location and course of the fissure line to be able to form an accurate risk classification. It is proposed herein to use the lung screen image data to learn location and course of the fissure line down to millimeters or fractions thereof. It will be appreciated herein that the notion of fissure lines refers to representation of sectional images through the object image 3D volume. In particular, in 3D it is more accurate to speak of fissure surfaces that form the interface between the lung lobes. In particular, it is not necessary, although this can still be done, to know the exact extent of the lobes. For present purposes it is sufficient to establish only the fissure lines/surface where the lobes meet or interface. The notion "fissure line" is well established and we shall use it herein, with the understanding that this image structure is actually a 2D surface that presents in certain cross-sectional imageries as lines structures.

As mentioned above earlier in the background of the present description, the object imagery, particularly lung cancer screening CT, has been acquired at a relative low dose. The object image is hence inflicted with a relatively high level of noise and has a relatively low spatial resolution. This is to reduce x-ray radiation exposure for the patient, but this makes the task of establishing over the required position the course of the fissure lines more challenging.

In the past, image filters have been developed as line or edge filters that respond to the, in general, locally linear appearance of the fissures in the imagery. These filters operate to transform the object image into a so called fissure volume (or more generally, into a filter volume), where now each image value represents the likelihood for at least one of the fissures to pass through the respective voxel position.

Figure 3A:
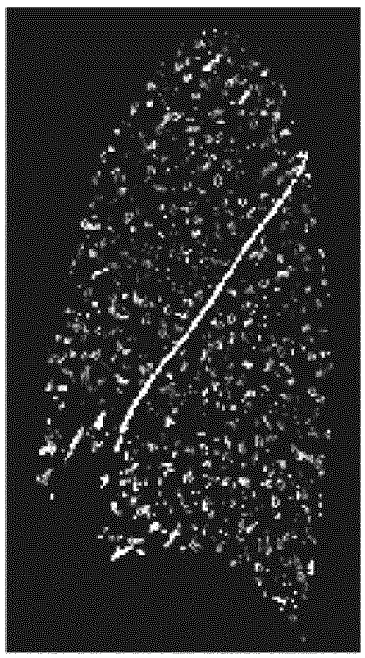
FIG. 3 shows exemplary imagery in relation to the described system and method.

These fissure, or more generally filter volumes, in general afford only a very coarse definition of the fissure lines and also include in general a large number of false positives, that is, locations that are mistakenly identified as belonging to a fissure line, as shown in exemplary filter imagery in FIG. 3A. Both of these shortcomings are largely due to the low resolution and high noise level of CT lung screening imagery.

The proposed imaging system IPS allows refining operation, in particular of existing line or edge filters although the proposed image processing system is capable of operating without such filters. Broadly, and as will be explained in more detail below, the proposed image processing system allows overcoming the tendency of existing edge filters to get trapped in local extrema when searching the object image for fissure lines. More particularly, in order to avoid being trapped in such local extrema, the proposed image processing includes a randomization scheme. This randomization scheme samples the image in the neighborhood of a fissure response as provided by a filter to thereby establish a more accurate localization of the fissure lines in the object image.

The image processing system is preferably operated in an iterative fashion. That is, the system starts from an initial estimate for the location and course of the fissure line. The initial estimate is provided by a number auxiliary anchor points AP whose geometrical distribution in space, or constellation, can be thought to broadly capture the 3D shape of the fissure line. These anchor points are then varied during execution of the image processing system to finally arrive after a number of iterations at an improved and more accurate definition of the one or more fissure lines.

Referring now in more detail to the block diagram of FIG. 1, an object image (eg, a lung image) is received at input port IN of the image processing system. For instance, a user at a work station may send a request that the desired object image of a certain patient etc is retrieved from the PACS or HIS and is provided to the input port IN of the image processing system. However, the request for having the object image processed may also be initiated automatically by the HIS or PACS system so may not necessarily be user initiated. Alternatively, the image may be supplied direct after acquisition from the imaging modality, that is, CT, MRI, US, SPECT, PET or other.

The object image is passed through an optional pre-processing stage which includes in particular an edge filter FIL to produce a filter response volume (in particular a fissure volume as explained above). Optionally, the filter response volume may also be smoothed to better account for the image noise.

It is the so filtered or smooth object image that is then received in this embodiment as input image at input port IN. The filter and/or smoother (if any) may be used selected by user or may be applied automatically without user input.

Either already specified in the input image or separately supplied by the user is a plurality of anchor points mentioned above. As will be explained in more detail this plurality of anchor points AP defines a certain constellation for the assumed location and course of the sought after fissure lines or structures.

Each anchor point $AP^i$ is defined by their co-ordinates $(x,y,z)^i$ and the collection of these co-ordinates of the anchor points define in 3D space (that is, in the input image) the constellation. The constellation is an approximate, discretized description of a geometric structure through which the fissure structure is thought to pass.

As briefly mentioned above and as will be explained in more detail below, the image processing system proceeds to refine these anchor points in one or more iterations to produce a different collection of anchor points at the conclusion of the iteration and this will be output at the output port OUT as an estimate for the actual location and course of the fissure structures (that is, one or more (preferably all) fissure lines). In other words, the anchor points as output at output port OUT defines a segmentation for the fissure lines. As will be explained in more detail below, a surface can be passed through the anchor points in the 3D object image to refine the discretized description into a quasi-continuous one.

Explaining the operation of the image processing system in more detail and with continued reference to block diagram FIG. 1, the system includes a constellation modifier CM that operates on the received initial set of anchor points to modify the same and to define in this manner a modified constellation. This can be done for instance by varying one or more co-ordinates of a single one or of more than one of the anchor points within the received plurality of initial anchor points. Preferably, this variation is performed at random and most preferably the variation is constrained to a hyper-plane within the image volume or is otherwise geometrically constrained. Geometrically constrained variations allows for improved segmentation results and keeping computation time down. In one embodiment a random selection is performed to pick a single one of the received anchor points. Then a single one or more of its co-ordinates is varied at random. For instance, one may wish to vary only the x,y components of the AP's co-ordinates or only the z component, and so forth. Thus in one embodiment, the modifier operates doubly-random, by first selecting at random one or more points and then to vary at random all or a sub-set of the co-ordinate components of the selected one or more APs. However, that is not to say that the proposed system is restricted to varying only a single co-ordinate and/or co-ordinates of a single point only. Alternative embodiments of this approach are also envisaged, where a sub-set of more than one point is selected from the set of anchor points and/or where a sub-set or more than one coordinate components (for example, all) of the selected anchor points is then varied. This degree of freedom in variation of the (initial) anchor points can be user adjusted or is hard-coded by the system-designer.

A constellation evaluator CE of the system operates to evaluate in particular the modified constellation as output by the constellation modifier CM. The constellation evaluator CE uses a score to quantify the evaluation. In one preferred embodiment (but necessarily in all embodiments), the evaluation score is based on a hyper-surface fitted to the modified constellation. In this preferred embodiment there is therefore a surface fitter CF (or curve fitter for 2D imagery) that fits the hyper-surface to the modified constellation. In other words, the anchor points in the modified constellation define spatial boundary conditions. Specifically, the anchor points prescribed locations for the fitted surface to pass through. Spline curves/surfaces or other fitting techniques can be used to this end. The evaluation can then proceed by evaluating geometric characteristics of the fitted surface. In particular, in one embodiment where a filter response volume associated with the initial input object image has been produced, evaluation can proceed as follows: for each voxel position on the fitted surface one determines the filter response at the respective location and one then sums up all filter responses along the whole of the fitted surface. This operation is essentially a discretized surface integral summation. As an alternative to this, and to save CPU time, the summation is restricted to a sub-set of surface points and does not extend over the whole of the surface. It is mainly envisaged that the filter response values are non-negative so that overall magnitude of the total surface sum so obtained is a good indication as to whether or not the surface is correctly located. The sum can be used as a score or "figure of merit" to guide the search for a realistic fissured line segmentation. In other words, an "optimal" surface can be expected to pass through voxel locations with relatively high filter response. However, because the image includes a lot of noise, filter responses themselves may not necessarily be trustworthy. Therefore, the proposed random variation scheme allows accounting for this to find the correct fissure segmentation amidst noise. The score produced by the currently modified constellation and/or the surface that is passed through same is then compared by comparator COMP to a threshold or other abortion criteria. If it is found that the criteria met, the current modified constellation is considered to sufficiently well define the segmentation and this is then output at output port OUT as briefly mentioned above. In addition to the modified APs, the fitted surface through the currently modified anchor points is also output as the segmentation. As mentioned earlier, the image processing scheme iterates through a number of constellations, by again modifying, in the next iteration cycle, the currently modified constellation and so on and the above described processing steps are repeated until the abortion criteria are found to be met.

In one embodiment, in order to geometrically restrict the random variation of the anchor points, the constellation modifier projects a single or a plurality of the co-ordinates of the currently considered constellation onto a hyper-plane. The hyperplane has been previously fitted to the anchor points in their current constellation. The hyper-plane is a 2D plane if the imagery considered is 3D (as is assumed herein for lung screening). If the imagery is 2D, the hyper-plane is merely a line. It is of note that this hyper-plane is different from the hyper-surface mentioned above. The hyper-surface was used to compute the score and to provide a quasi-continuous representation of the segmentation. The hyper-plane on the other hand is used to restrict the variation of the coordinate components. Specifically, the above defined random variation is performed only in the hyper-plane for the one or more anchor points of the current constellation. For each of the varied co-ordinates in the hyper-plane, the height or direction away from the hyper-plane towards the fitted hyper surface is then interpolated so complete construction of the remaining coordinate component of the new anchor points. The so newly constructed anchor points together with the non-varied anchor points from the earlier iteration cycle then form a new, subsequent constellation for the next iteration cycle. The total number of anchor points, the earlier one(s) and the newly constructed ones, remains preferably constant. This hyper-plane operation is performed by the constellation modifier CM.

Other ways to geometrically constrain the random operation are also envisaged herein. Although performing a variation in a random fashion is the preferred embodiment, this is not to exclude deterministic methods. The random operation itself can be performed by running a random number generator to produce a random number in a pre-defined range, usually between 0 and 1. This random number is then mapped into co-ordinates of a neighborhood around the coordinate components to be varied. This further allows geometrically restricting the variation. In other words, and referring back to the hyper-plane based embodiment, once the anchor point is projected onto the hyper-plane, the variation of the co-ordinate components is restricted to a neighborhood (an ellipse, a circle, rectangle, etc) in the said hyper-plane. The size of the neighborhoods to which the random number is mapped can again be user adjusted or pre-set by the designer as a design variable.

It will be appreciated, that the iterations herein can be aborted after a pre-set number of steps or can be aborted once sufficient convergence is detected.

The initial constellation provided at the input port may be derived from manual segmentations performed on a cohort of training images performed by human experts for instance. The cohort images, and the currently processed object images can be assumed to be sufficiently registered spatially with each other so that the anchor point co-ordinates can be taken at face value and be directly applied to the object image to define the initial constellation. In other words, no co-ordinate transformation is necessary although this can still be done if the cohort image and the object image are not in registration.

The image processing system as proposed herein can thus be seen to implement a randomized optimized scheme, where the score forms an objective function. Various ways are envisaged herein, so as to enforce that the score is improving throughout the iterations.

One way to do this is to simply ignore constellations that return scores lower than the scores returned in the earlier iteration cycles. One way to do this is to start with a plurality of N constellations in a list ordered according to their pre-computed score and to modify by operation of modifier CM only the top (N>n≥1) members of this list. Once the improved segmentation result (that is the adjusted constellation and/or the surface passed there through) is output at output port OUT, this can then be optionally visualized together with the input image via a visualizer VIZ and rendered for display on a monitor device MT.

In addition or instead of visualizing the segmentation result, a classifier component CC operates, based on fissure line segmentation, to classify nodules identified by a separate nodule segmentation scheme in the object image. Such segmentation schemes are well known in the art and any of these can be applied for the purposes of the presently proposed system. In more detail, a nodule-segmentation defines a sub-portion in the input image. This sub-portion comprises a number of voxels with their respective image values. For each voxel position in the nodule segmentation the location thereof is now compared against the fissure segmentation output at output port OUT. In particular, for each nodule voxel, its location can be compared to the co-ordinates of the fissure location surface and one can decide at which side of the segmentation surface the respective voxel location is located. A voting procedure may then be used to decide globally for the nodule segmentation as a whole, on which side of the segmented fissure the nodule, as a whole, is located. Using suitable thresholding or "voting" one can conclude, for instance, that if a (possibly qualified) majority of all voxel locations are on one side of the surface, then the whole nodule is classified to lie on that side of the fissure surface. The outcome of this classification operation is thus threefold: it can be decided that the nodule segmentation lies in its whole on one side of the fissure surface, or, on the other side of the fissure surface, or that the nodule is in fact a "trans-nodule" extending across the surface. Using medical knowledge, an estimate can be made as to the malignancy of the nodule. A precise fissure segmentation also informs about the location of lobes themselves. It can therefore be established with greater accuracy in which lobe the nodule is located. This is desirable as this location is also a malignancy indicator as mentioned above.

Figure 2:
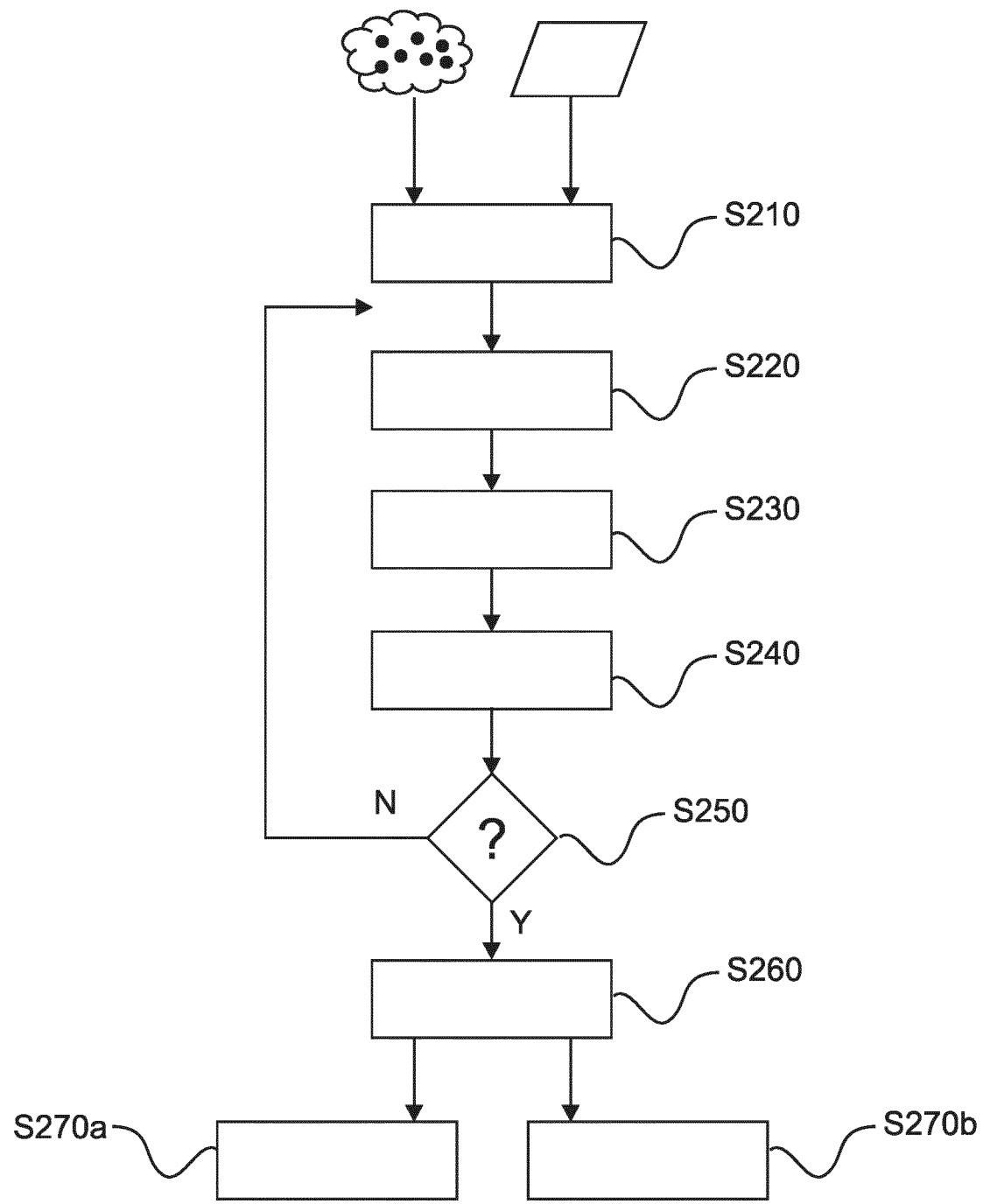
FIG. 2 shows a flow chart of an image processing method.

Reference is now made to the flow chart in FIG. 2 to explain in more detail image processing system of FIG. 1. However, it will be understood that the steps described in the following may also be understood as a teaching in their own right. In particular, the teaching is not necessarily tied to the architecture of the image processing system as per FIG. 1.

Again main reference will be made to lung imagery for the purpose of fissure segmentation. However, this is not to be construed as limiting, so the processing of imagery encoding other anatomies or imagery not related to the medical field are specifically envisaged herein in alternative embodiments. The proposed method allows robust segmentation in imagery with low resolution and/or high noise level.

At step S210 an object image (in particular, a 3D image volume such as from CT, MRI or other) is received. Incorporated in this image so received or separately received is a set of anchor points that define a geometric constellation in the input image.

Optionally, the global anatomy of interest (such as one or both lungs) has been previously segmented out from the object image so as to remove background information from the input image. Other optional pre-processing steps include edge filtering applied to the object image to define possible locations for the fissure lines or other structures of interest.

The filter response is applied for each voxel of the object image. The filter value (a number, referred to herein as "response") provides a fissure likelihood for each voxel of the object image (eg, CT volume). Various such filters are described by Alexander Schmidt-Richberg et al in "Evaluation of Algorithms for Lung Fissure Segmentation in CT Images", Bildverarbeitung für die Medizin 2012, Editors: T. Tolxdorff et al, pp 201-206, 2012, Spinger Berlin Heidelberg, and any of these filters or a combination thereof are envisaged herein in different embodiments. See also table 2, page 3 in the Qi et al reference cited above in the "Background" section. The fissure filter can be based either directly on the manifestation of the fissure as Hounsfield values, or on the local void between the pulmonary vessels (ridge line in a distance transform). Specifically, the determining of the fissure location can be done either explicitly or implicitly or via a combination of both. Explicit detection is based on applying a filter to detect the fissures in terms of higher Hounsfield values compared to the surrounding lung parenchyma. In an implicit detection, the location of the fissures is determined as the local absence of (larger) pulmonary vessels. This can be e.g. done by first highlighting the vessels using a vessel filter and then applying a distance transform to the thresholded vessel feature image. Ridge lines in the distance transform provide candidates for the fissure location. Both approaches, the explicit one (based on appearance of fissures in the image) and the implicit one (based on absence of vessels structures) can also be combined.

As a further pre-processing step, the filter response volume is smoothed using Gaussian smoothing or any other smoothing filter. If any edge filter is used, this is preferably applied first and the smoothing filter is applied to the edge filer response volume. The reverse order (smoothing filter first and then edge filter) is also possible.

The so pre-processed image volume will be referred to herein as the filter response volume (or fissure volume) and it is this filter response volume that is processed in the following steps as the input image.

The initial constellation as defined by the initially received anchor points are suitably registered onto the input image. The initial constellation may, for instance, be requested from medical expert systems or data base or other and is derived from earlier manual segmentations on suitable cohort of training lung images. These initial set of anchor points will be used as explained in more detail below to initialize the following iterative procedure.

The method is preferably iterative. During the iteration a sequence of constellations are produced for each iteration step. Reference in the following is hence made to the current constellation and this is either the initial constellation or one produced as a later iteration step.

At step S220 the current constellation is modified preferably but not necessarily in a random manner. This random driven modification is implemented in one embodiment by applying a random operation to one or more co-ordinate components in one or more of the current anchor points AP.

In an optional step S230, a hyper-surface (eg, a 2D surface in the 3D volume) is fitted to the current constellation of APs. More particularly, a two-dimensional thin-plate-spline surface is fitted in the three-dimensional volume to each of the three lobar fissures (two right and one left). Each spline surface is supported by a fixed number F of the 3D anchor points. E.g. F=16 for major vertical fissure, and 12 for minor horizontal fissure.

At step S240 the constellation is then evaluated. This can be done in a number of different embodiments all envisaged herein. In one embodiment the evaluation is based on the hyper-surface in combination with the values of the filter response volume. More particularly, the fitted surface picks out a set of filter response values (namely those at the locations through which the surface passes). In other words, a discretized version of a surface integral is formed. The sum of filter response values, over the fitted surface, defines an objective function and the sum is considered a score/figure of merit and it is herein to iteratively improve (in case, to increase) the score. The proposed method is thus a randomized optimization procedure. It is not necessary however, that the score must necessarily grow as this is largely a matter of formulation, that is, whether the score is formulated as a utility (as it is here) or as a cost. In the later formulation, the iterative optimization will accordingly aim to decrease the score. In one embodiment, the score is weighted with numerical weights which reflect certain anatomical boundary conditions, e.g. typical volume of each lobe, typical normal vector directions (angles) of the fissures. For instance, for the minor right horizontal fissure only filter responses are accumulated for locations which are more cranial than the major vertical fissure.

At step S250 a figure of merit for the current, in this case the surface integral for the current constellation is compared against a pre-defined set of one or more stopping conditions or criteria.

If the criteria are not met, the procedure returns to step S220 to again modify the current constellation into a new one and the method progress through the previous steps to arrive an updated figure of merit. One stopping criteria may include comparing the current and earlier figure of merit generated during the iterations to determine a level of change between the two consecutive figures of merit. If this change drops below a certain threshold value, it is determined that the iteration converged to a sufficient level and the iteration is aborted.

If the stopping criteria are met, the latest available constellation is then output at step S260 as a definition of the fissure segmentation.

According to one embodiment the proposed method of image processing is configured to ensure that figure of merit produced during of each iteration cycle, does not worsen but is at least maintained, better yet improved. One way to do this is to use a list-based approach, which is explained in more detail below. More particularly, according to one embodiment the constellation list is set up with not a single initial constellation but a list of N (≥1) typical constellations. Specifically, the constellation list is initiated with a number of N typical constellations, derived from a number of manual segmentations. Each new constellation on the list is evaluated at step S240, and the list is re-ordered according to highest score (figure of merit). Only for each of the top-n constellations (the ones with the highest score), M (≥1) random variants are derived at step S220, and added to the list.

However, this method of enforcing convergence should not be construed to exclude other approaches to achieve figure of merit improvement.

According to one embodiment, the step S220 of modifying a current constellation includes geometrically restricting the geometrical degrees of freedom when varying one or more of the coordinate components of the one or more anchor points. This can be done in one embodiment by using a given current constellation in the following way: The 3D spline anchor points are projected onto a linear support plane (the hyper-plane). This projection operation yields an x,y plane coordinate in the hyperplane and an interpolated height z. The x-y-location of a new spline anchor point is then selected at random in a certain fixed neighbourhood radius of the existing x-y spline anchor location in the hyperplane. For this new x-y support plane location, an optimal z-height is determined by variation of the current height (as interpolated from the current spline surface) within a certain search range. A series of constellation is produced in this one (each z-height variation), and each is re-evaluated at step S250 by using the objective function (eg, by computing the surface integral) for each z-height. The new x,y coordinate components and the new z-height then define together a new anchor point in 3D. It should be understood that in the above approach no additional anchor point is created, that is, the total number of anchor points remain constant. The new anchor point obtained via the above described variation approach is then adopted in the constellation instead of the anchor pointed that has been subjected to the variation. However, in alternative embodiments, the number of anchor points may change indeed.

At the conclusion of the iteration, the segmentation result is i) the constellation at the top of the list or ii) more generally, all constellations within the top n entries of the list. The constellations themselves are a discrete definition of the segmentation. A suitable (at least quasi-)continuous representation of the segmentation is the respective hyper-surfaces that forms in the original object image the fissure line or lobe interfaces.

It should be understood that the above described approach of defining a figure of merit in terms of the fitted hyper-surface is not the only embodiment envisaged herein. Other geometrical properties of the constellation may also be considered herein to define a geometrically motivated or otherwise figure of merit. For instance, the constellation may be looked at as a discrete lattice work. Inspired by considerations in material sciences (elasticity theory), internal and external "virtual" forces can then be defined to guide the optimization.

In the above described list-approach, it will be understood that the output is not necessarily a single best segmentation result (to top entry) but all the n(>1)-constellations at the top end of the list may be considered as optimal. In other words, in this embodiment a plurality (n) outputs may be supplied at step S260, but this can be adjusted by the user. In other words, only the top constellation is output as the final segmentation result or all the top n(>1)-constellations are so output.

The one or more fissure segmentations defined by the respective anchor point constellations and/or their hyper-surface can then be used to process the initial object image. In one embodiment, this processing is done in a step S270B where the segmentation result is overlaid on the initial image and is rendered for display on the display unit. This allows a user to visually examine the quality of the computed segmentation.

In addition to this, and/or instead, a classification of image structures is performed at step S270A based on the segmentation. In one embodiment nodule segmentations, applied to the initial input image in a separate step before or after executing the above described segmentation procedure, are performed by any known nodule segmentation technique. The proximity of the segmented nodule structures relative to the fissure segmentations obtained at step S260 can then be used to classify the malignancy of the nodule segmentations. More particularly, for a given lung nodule segmentation, all voxel locations are sampled for a voting and the, possibly qualified, majority is then used to decide to which lobe the nodule belongs as a whole.

Although not necessarily in all embodiments, in a preferred embodiment the total number of anchor points remains fixed throughout the iterations. In other words, although one or more of existing anchor points are changed, the total number of anchor points in each constellation remains constant. The number of anchor points to be used will vary from application to application. For instance, in the present context of lung imaging the number F=#(AP)~10 or less has been observed to yield sufficiently good results. This is because, a typical fissure is a piecewise smooth surface with some but not many surface wrinkles. The restriction to F anchors thus serves as a regularization which favours anatomically meaningful constellations. A bounded number F guarantees that each spline surface which is needed for evaluation (sampling of the filter response volume) can be computed in very short time. (Spline surface computation costs rise with $F^2$). In other contexts where the surface structures involved are craggier and more difficult, a higher number of anchor points may be used to define the respective constellations.

In particular the steps of generating (S220) and evaluating (S250) of constellation variants can be fully or at least partly parallelized, leading to fast computation times. For instance, one may compute the different constellation in parallel and when can then evaluate these constellations in a parallelized manner. The generation of random variants of the n top-rated constellations ensures that the optimization is not trapped in a local maximum.

Figure 3B:
Figure 3C:

In sum, the proposed method (and the related system):
- is robust against high noise, such as in low dose screening CT
- robust against limited resolution, such as in thick-slice reconstruction CT
- allows for efficient computation and low implementation costs
- affords graceful degradation in case of failure
- successfully negotiates even a high number of spurious local maxima as encountered in filter response volumes Reference is now made to FIG. 3 which shows exemplary imagery in relation to the proposed method. FIG. 3A (already referred to above) shows an example of a fissure filter response volume. It can be seen that in addition to the true fissure location a large number of "false positives" are produced by the filter, shown as grey image portions distributed throughout the lung volume.

Figure 4:
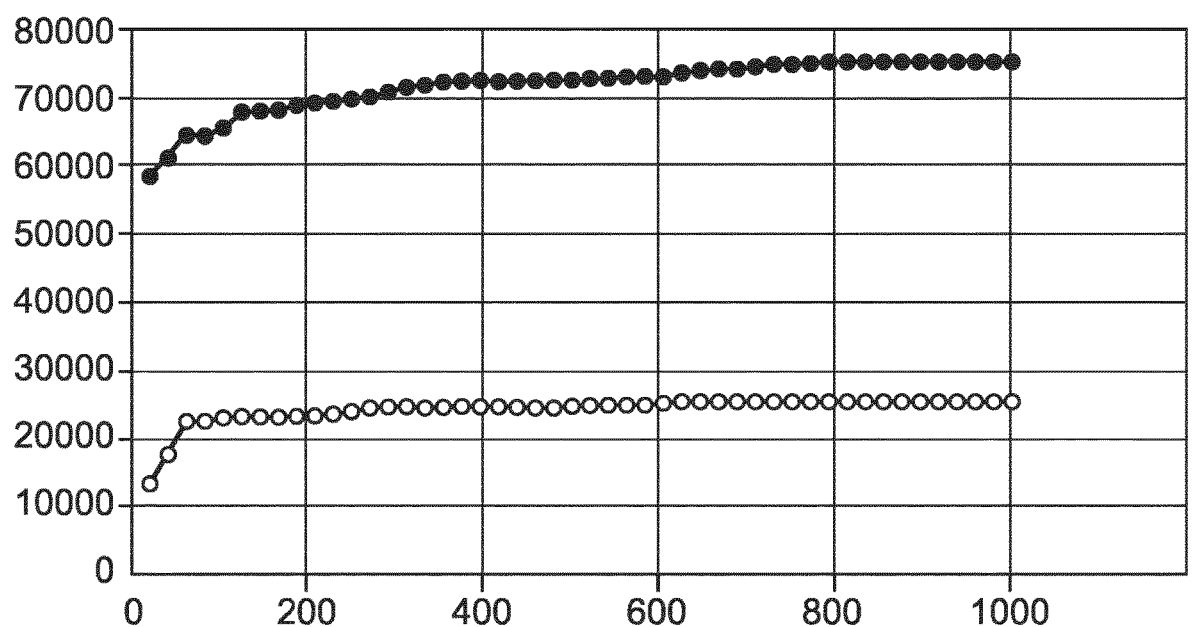
FIG. 4 shows an illustration of convergence behavior of the proposed method when used in an iterative manner.

FIGS. 3B and C show typical low dose, high noise, low resolution CT reconstructions from lung cancer screening. The Figures illustrate spurious or false positive results from a fissure filter shown in grey alongside the fitted solution illustrated in white for the major and minor fissure, separating upper, middle and lower lobes of the right lung. FIG. 4 is an example illustration of the evolution of the score for the major (upper graph) and minor (lower graph) right fissure. It can be seen that a sufficient level of convergence can be achieved, in particular for the minor right fissure at about a thousand iterations.

It will be understood, that the imagery in FIG. 3 and the iteration evolution in FIG. 4 are merely exemplary and are limiting what is described herein.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
an input interface (IN) configured for receiving an n[≥2]-dimensional input image with a set of anchor points defined in said input image, said set of anchor points forming an input constellation;
a constellation modifier (CM) configured to modify said input constellation into a modified constellation by varying at least one coordinate of at least one of the anchor points and projecting at least one of the coordinates of the at least one anchor point of the input constellation onto a hyperplane through the anchor points, where the hyperplane is previously fitted to the anchor points in said input constellation, and where the varying is confined to within said hyperplane;
a constellation evaluator (CE) configured to evaluate said modified constellation to produce a score;
a comparator (COMP) configured to compare said score against a quality criterion, said criterion evaluating a suitability of the modified constellation to define a segmentation for said input image; and
an output interface (OUT) for outputting said modified constellation if the score meets said criterion.

2. The Image processing system of claim 1, where the constellation modifier (CM) is configured to apply a random operation to vary the at least one coordinate.

3. The image processing system of claim 1, comprising a surface fitter (CF) configured to fit an [n−1]-dimensional hypersurface to said modified input constellation, and wherein the constellation evaluator (CE) produces said score based on said hypersurface, wherein said hypersurface is output as the segmentation.

4. The image processing system of claim 3, comprising a classifier component (CC) configured to classify whether a segmented image portion in the input image lies to either side of the hypersurface or whether said segmented portion extends through the hypersurface.

5. The image processing system of claim 1, comprising a visualizer (VIZ) configured to visualize the input image with said hypersurface or said constellation on a display device (MT).

6. The image processing system of claim 1, configured to iterate through a plurality of constellations including said input constellation so as to improve, or to at least maintain, said score.

7. The image processing system of claim 1, wherein the number of anchor points remains fixed.

8. The image processing system of claim 1, wherein the input image is a 3D image volume of a human or animal lung.

9. A method of image processing, comprising the steps of:
receiving an n[≥2]-dimensional input image with a set of anchor points defined in said input image, said set of anchor points forming an input constellation;
modifying said input constellation into a modified constellation by varying at least one coordinate of at least one of the anchor points and projecting at least one of the coordinates of the at least one anchor point of the input constellation onto a hyperplane through the anchor points, where the hyperplane is previously fitted to the anchor points in said input constellation, and where the varying is confined to within said hyperplane;
evaluating said modified constellation to produce a score;
comparing said score against a quality criterion, said criterion evaluating a suitability of the modified constellation to define a segmentation for said input image; and
outputting said modified constellation if the score meets said criterion.

10. The method of image processing of claim 9, comprising: fitting an [n−1]-dimensional hypersurface to said modified input constellation, wherein the score in said evaluating step is based on said hypersurface.

11. The method of image processing of claim 10, wherein said hypersurface is output as the segmentation.

12. A non-transitory computer readable medium having stored thereon a computer program element, which, when being executed by one or more processing units (PU) is adapted to:
receive an n[≥2]-dimensional input image with a set of anchor points defined in said input image, said set of anchor points forming an input constellation;
modify said input constellation into a modified constellation by varying at least one coordinate of at least one of the anchor points and projecting at least one of the coordinates of the at least one anchor point of the input constellation onto a hyperplane through the anchor points, where the hyperplane is previously fitted to the anchor points in said input constellation, and where the varying is confined to within said hyperplane;
evaluate said modified constellation to produce a score;
compare said score against a quality criterion, said criterion evaluating a suitability of the modified constellation to define a segmentation for said input image; and
output said modified constellation if the score meets said criterion.

13. The method of claim 9, wherein the varying includes applying a random operation to the at least one coordinate.

14. The method of claim 9, further comprising:
visualizing the input image with said hypersurface or said constellation.

15. The method of claim 9, further comprising:
iterating through a plurality of constellations including said input constellation.

16. The non-transitory computer readable medium of claim 12, wherein the computer program element is further adapted to:
fit an [n−1]-dimensional hypersurface to said modified input constellation.

17. The non-transitory computer readable medium of claim 12, wherein the computer program element is further adapted to:
apply a random operation to vary the at least one coordinate.

18. The non-transitory computer readable medium of claim 12, wherein the computer program element is further adapted to:
visualize the input image with said hypersurface or said constellation.

19. The non-transitory computer readable medium of claim 12, wherein the computer program element is further adapted to:
iterate through a plurality of constellations including said input constellation.

20. The non-transitory computer readable medium of claim 12, wherein the number of anchor points remains fixed.

* * * * *